(12) United States Patent
Kinugasa et al.

(10) Patent No.: US 10,065,679 B2
(45) Date of Patent: Sep. 4, 2018

(54) DRIVING SUPPORT DEVICE FOR VEHICLE

(71) Applicant: TOYOTA JIDOSHA KABUSHIKI KAISHA, Toyota-shi (JP)

(72) Inventors: Hidenobu Kinugasa, Nagoya (JP); Yuji Okuda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 44 days.

(21) Appl. No.: 15/204,671

(22) Filed: Jul. 7, 2016

(65) Prior Publication Data

US 2017/0008561 A1 Jan. 12, 2017

(30) Foreign Application Priority Data

Jul. 7, 2015 (JP) .................... 2015-135810

(51) Int. Cl.
| | | |
|---|---|---|
| A01B 69/00 | (2006.01) | |
| B62D 6/00 | (2006.01) | |
| B62D 11/00 | (2006.01) | |
| B62D 12/00 | (2006.01) | |
| B63G 8/20 | (2006.01) | |
| B63H 25/04 | (2006.01) | |
| G05D 1/00 | (2006.01) | |
| G06F 7/00 | (2006.01) | |
| G06F 19/00 | (2018.01) | |
| G06F 17/00 | (2006.01) | |
| B62D 15/02 | (2006.01) | |
| B60W 30/12 | (2006.01) | |
| B60Q 9/00 | (2006.01) | |
| B62D 6/02 | (2006.01) | |
| B60W 50/14 | (2012.01) | |

(52) U.S. Cl.
CPC ............ B62D 15/025 (2013.01); B60Q 9/00 (2013.01); B60W 30/12 (2013.01); B62D 6/02 (2013.01); *B60W 2050/143* (2013.01); *B60W 2520/10* (2013.01); *B60W 2540/18* (2013.01)

(58) Field of Classification Search
CPC ............ B60Q 9/00; B60W 30/12; B62D 6/02
USPC .......................................... 701/41
See application file for complete search history.

(56) References Cited

FOREIGN PATENT DOCUMENTS

| | | |
|---|---|---|
| DE | 10 2007 062 698 A1 | 7/2009 |
| DE | 10 2009 028 647 A1 | 2/2011 |
| JP | 5-118554 A | 5/1993 |
| JP | 2012-131466 A | 7/2012 |
| JP | 2014-142965 A | 8/2014 |
| JP | 2015-101240 A | 6/2015 |
| JP | 2015-120374 A | 7/2015 |
| WO | WO 2015/079909 A1 | 6/2015 |

*Primary Examiner* — Maceeh Anwari
(74) *Attorney, Agent, or Firm* — Oblon, McClelland, Maier & Neustadt, L.L.P.

(57) ABSTRACT

A driving support device for a vehicle includes a hand-off determination unit configured to determine whether or not a specific condition is satisfied, the specific condition being a condition that a steering wheel is regarded as not being operated by a driver, a support interruption unit configured to interrupt a lane departure prevention support control when the hand-off determination unit determines that the specific condition is satisfied, a vehicle speed detection unit configured to detect a vehicle speed, and a vehicle speed response processing unit configured to control whether the support interruption unit interrupts the lane departure prevention support control based on the vehicle speed.

11 Claims, 10 Drawing Sheets

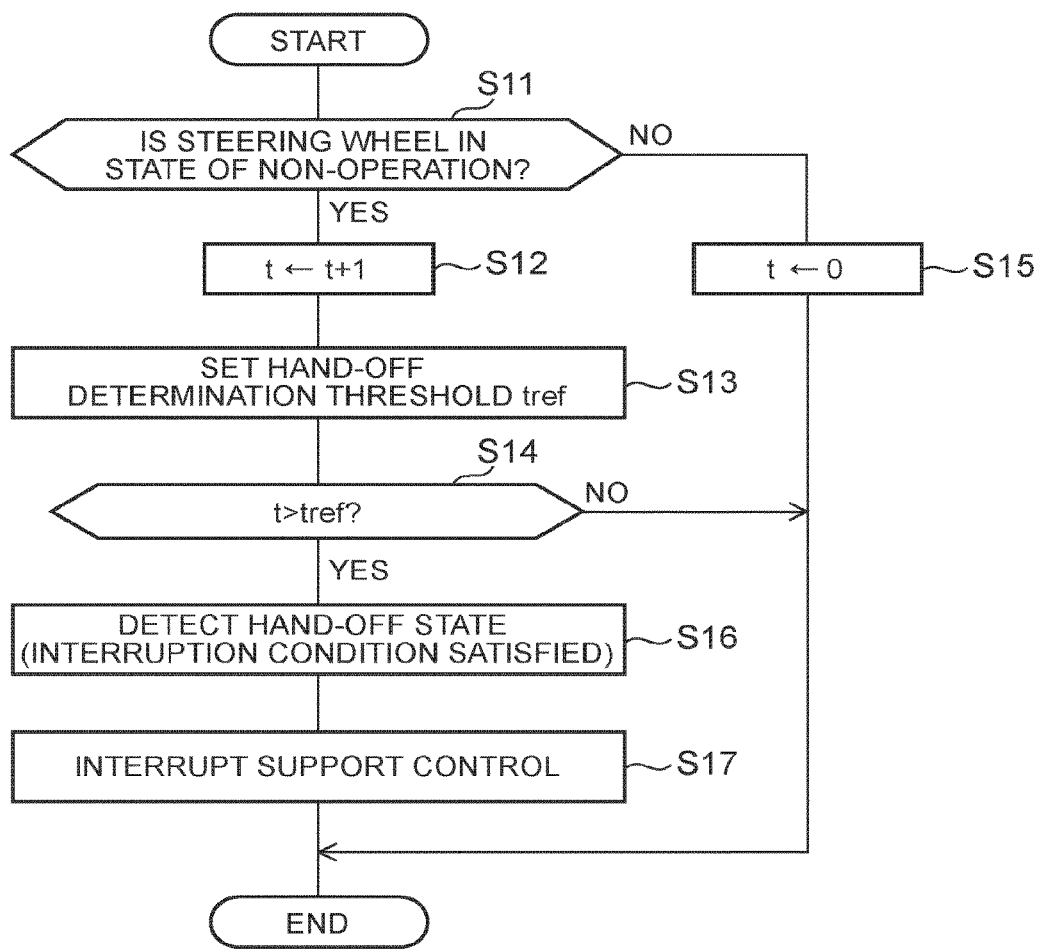

DRIVING SUPPORT DEVICE FOR VEHICLE

INCORPORATION BY REFERENCE

The disclosure of Japanese Patent Application No. 2015-135810 filed on Jul. 7, 2015 including the specification, drawings and abstract is incorporated herein by reference in its entirety.

BACKGROUND

1. Field of the Disclosure

The present disclosure relates to a driving support device for a vehicle that carries out a lane departure prevention support control for supporting driving by a driver so that the vehicle travels in a lane.

2. Description of Related Art

A driving support device for a vehicle that carries out a lane departure prevention support control has been known. In the lane departure prevention support control, white lines on the right and left of a road are detected by, for example, a camera sensor. A target trace line in a traveling lane such as a center line between the right and left white lines is set based on these right and left white lines. Then, a driver's steering operation is supported by a steering auxiliary torque being given to a steering mechanism so that a traveling position of a host vehicle is maintained in the vicinity of the target trace line. Also known are types of lane departure prevention support control calling the driver's steering operation by allowing a buzzer to sound and giving the steering mechanism a small steering auxiliary torque when the host vehicle is likely to depart from the traveling lane. The former lane departure prevention support control is referred to as a lane keeping support control, and the latter lane departure prevention support control is referred to as a lane departure alarm control.

This lane departure prevention support control is different from an autonomous driving control, is to support the driver's steering wheel operation so that the host vehicle does not depart from the target trace line or the traveling lane, and is not a control implying that the driver's steering wheel operation is unnecessary. A driving support device that is disclosed in Japanese Patent Application Publication No. 2014-142965 is configured to interrupt the lane departure prevention support control in a case where the driver's hand-off driving is detected while the lane departure prevention support control is carried out. The detection of the driver's hand-off driving is determined when, for example, the steering wheel operation does not continue to be performed for at least a predetermined period of time.

In general, the determination of the presence or absence of the steering wheel operation is performed based on a steering torque that is detected by a torque sensor which is disposed in a steering shaft. It is determined that the steering wheel operation is not performed when the steering torque is less than a threshold. The driver's hand-off driving is determined when a duration in which the steering torque is less than the threshold continues for at least a predetermined period of time.

A vehicle speed region in which the lane departure prevention support control is carried out is limited so that the lane departure prevention support control is carried out only during a high-speed traveling. In this regard, there is a demand for carrying out the lane departure prevention support control in all vehicle speed regions with the vehicle speed region expanded to a low-speed side. A response to this demand is likely to result in a more-than-necessary interruption of the lane departure prevention support control that is attributable to the determination of the driver's hand-off driving during a low-speed traveling, which might cause the driver to be bothered.

During the low-speed traveling, for example, there is a case where the vehicle is allowed to travel along the traveling lane even without the driver's steering wheel operation. In this case, the duration in which the steering operation is not performed might reach a predetermined length of time despite the steering wheel being gripped by the driver. In this case, the driver's hand-off driving is determined and the lane departure prevention support control is interrupted. Accordingly, the driver might be given no driving support during the low-speed traveling despite the driver performing a normal driving operation.

BRIEF SUMMARY

The present disclosure provides a driving support device for a vehicle that reduces a driver's discomfort by preventing a more-than-necessary interruption of a lane departure prevention support control.

A driving support device for a vehicle according to an aspect of the present disclosure includes a hand-off determination unit configured to determine whether or not a specific condition is satisfied, the specific condition being a condition that a steering wheel is regarded as not being operated by a driver during execution of a lane departure prevention support control for giving a steering mechanism a steering auxiliary torque such that the vehicle travels within a lane, a support interruption unit configured to interrupt the lane departure prevention support control when the hand-off determination unit determines that the specific condition is satisfied, a vehicle speed detection unit configured to detect a vehicle speed, and a vehicle speed response processing unit configured to control whether the support interruption unit interrupts the lane departure prevention support control based on the vehicle speed.

According to the aspect described above, the hand-off determination unit may be configured to determine that the specific condition is satisfied when a non-operation duration of the steering wheel exceeds a hand-off determination time.

According to the aspect described above, the vehicle speed response processing unit may be configured to cause the specific condition to be less likely satisfied in a case where the vehicle speed is lower than a predetermined vehicle speed than in a case where the vehicle speed is higher than the predetermined vehicle speed.

According to the aspect described above, the vehicle speed response processing unit may be configured to prohibit the interruption of the lane departure prevention support control by the support interruption unit in a case where the vehicle speed is lower than a set vehicle speed.

According to the aspect described above, the vehicle speed response processing unit may be configured to set the hand-off determination time pertaining to the case where the vehicle speed is lower than the predetermined vehicle speed to be longer than the hand-off determination time pertaining to the case where the vehicle speed is higher than the predetermined vehicle speed.

According to the aspect described above, the hand-off determination unit may be configured to measure the non-operation duration during the execution of the lane departure prevention support control, and the vehicle speed response processing unit may be configured to stop the measurement of the non-operation duration by the hand-off determination unit in a period when the vehicle speed is lower than the set vehicle speed.

According to the aspect described above, the hand-off determination unit may be configured to measure the non-operation duration during the execution of the lane departure prevention support control, and the vehicle speed response processing unit may be configured to set the hand-off determination time to a length of time in which the non-operation duration does not reach the hand-off determination time in a period when the vehicle speed is lower than the set vehicle speed.

The aspect described above may further include a cautioning unit configured to call the driver's attention when the non-operation duration exceeds a caution determination time shorter than the hand-off determination time, wherein the vehicle speed response processing unit may be configured to set at least one of the caution determination time and the hand-off determination time to a longer time in a case where the vehicle speed is lower than the predetermined vehicle speed than in a case where the vehicle speed is higher than the predetermined vehicle speed.

According to the aspect described above, the hand-off determination unit may be configured to determine that the specific condition is satisfied when an operation amount of the steering wheel is less than a non-operation determination threshold.

According to the aspect described above, the vehicle speed response processing unit may be configured to set a higher value for the non-operation determination threshold pertaining to the case where the vehicle speed is lower than a predetermined vehicle speed than the non-operation determination threshold pertaining to the case where the vehicle speed is higher than the predetermined vehicle speed.

According to the aspect described above, the excessive interruption of the lane departure prevention support control can be reduced. As a result, the driver's discomfort can be reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a flowchart illustrating a hand-off state determination routine according to the embodiment;

DETAILED DESCRIPTION OF EMBODIMENTS

Figure 1:
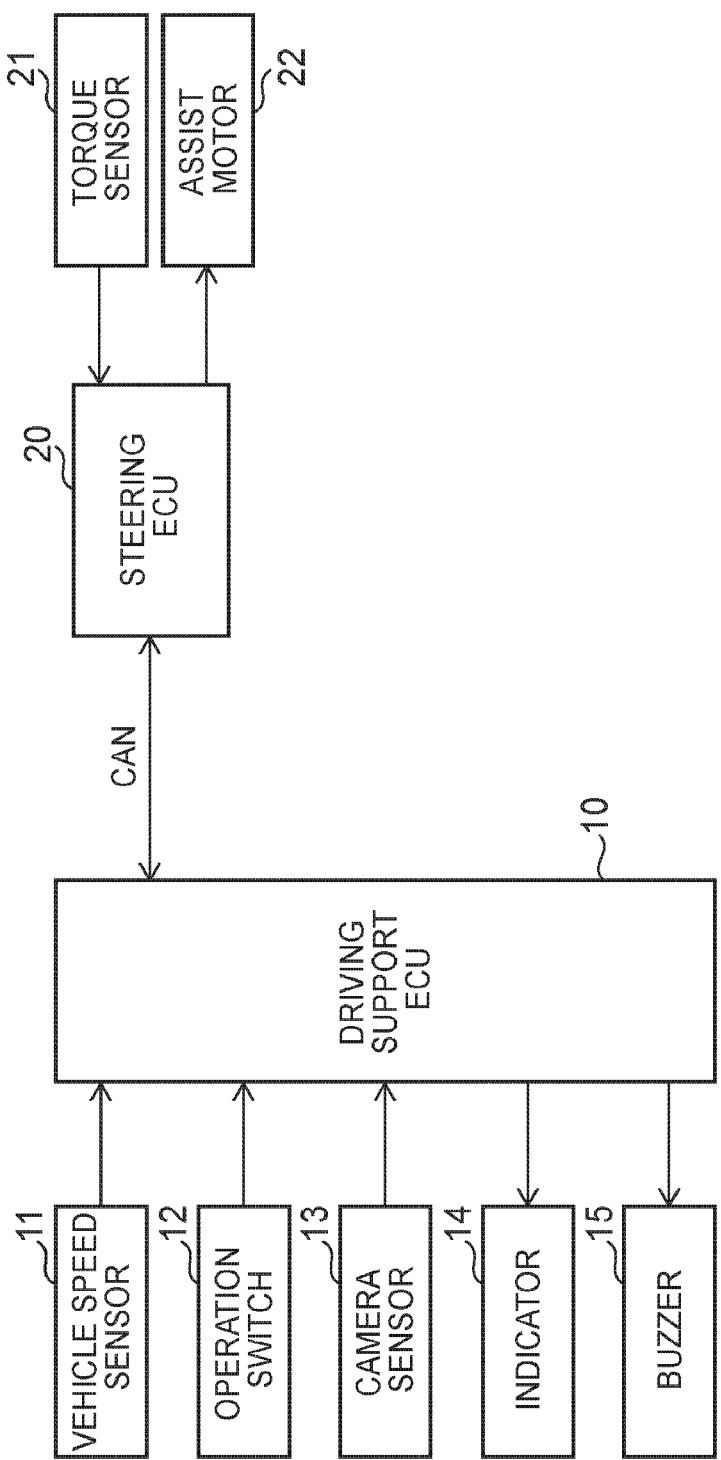
FIG. 1 is a schematic system configuration diagram of a driving support device for a vehicle according to an embodiment.

Hereinafter, an embodiment of the present disclosure will be described in detail with reference to accompanying drawings. FIG. 1 is a schematic system configuration diagram of a driving support device for a vehicle according to this embodiment.

The driving support device for a vehicle according to this embodiment is provided with a driving support ECU 10. This driving support ECU 10 is an electronic control device for supporting driving by a driver. The driving support ECU 10 is provided with a microcomputer as a main section. The driving support ECU 10 carries out a lane departure prevention support control. The driving support ECU 10 uses a steering assist function of an electric power steering device in carrying out the lane departure prevention support control.

The driving support ECU 10 is connected to a steering ECU 20, which is a control unit of the electric power steering device, via a controller area network (CAN) to be capable of two-way transmission and reception. The steering ECU 20 is provided with a microcomputer and a motor drive circuit as main sections. The steering ECU 20 detects a steering torque that is input to a steering wheel (not illustrated) by the driver by using a steering torque sensor 21 which is disposed in a steering shaft, and assists in the driver's steering operation by controlling driving of an assist motor 22 based on this steering torque. In the present specification, the microcomputer includes a CPU and a storage device such as a ROM and a RAM. The CPU realizes various functions by executing instructions (programs) that are stored in the ROM.

In a case where an auxiliary torque command is received from the driving support ECU 10, the steering ECU 20 generates a steering auxiliary torque by driving the assist motor 22 by a control amount that is specified by the auxiliary torque command.

The driving support ECU 10 acquires steering torque information detected by the steering torque sensor 21 so as to detect the driver's steering operation situation. This steering torque information is acquired from the steering ECU 20 via the CAN.

A vehicle speed sensor 11, an operation switch 12, a camera sensor 13, an indicator 14, and a buzzer 15 are connected to the driving support ECU 10. The vehicle speed sensor 11 outputs a detection signal that shows a vehicle speed V of a host vehicle to the driving support ECU 10. The operation switch 12 is a switch that allows the driver to select whether or not to carry out the lane departure prevention support control. The operation switch 12 outputs a selection signal to the driving support ECU 10. In a case where the operation switch 12 is turned ON, the lane departure prevention support control is carried out.

The camera sensor 13 recognizes lane markers (such as white lines) on the right and left of a road by imaging a space in front of the vehicle and performing image processing. The camera sensor 13 determines a target trace line for traveling of the host vehicle (such as a central position of a lane) based on the lane markers and calculates a deviation angle between a direction of the target trace line and a vehicle traveling direction (hereinafter, referred to as a yaw angle), a deviation amount of a vehicle center-of-gravity position with respect to the target trace line in a road width direction (hereinafter, referred to as an offset amount), a curvature of the target trace line (hereinafter, referred to as a road curvature), a lane width of a traveling lane, and the like. Lane information as results of these calculations is output to the driving support ECU 10 by the camera sensor 13. In a case where imaging is the only function of the camera sensor 13, the driving support ECU 10 may execute some or all of the calculation functions of the camera sensor 13 described above (that is, some or all of the image processing, lane marker recognition, target trace line determination, yaw angle calculation, offset amount calculation, road curvature calculation, lane width calculation regarding the traveling lane, and the like).

The indicator 14 is disposed at a position that can be seen from a position of a driver's seat in which the driver sits. The indicator 14 displays support control information transmitted from the driving support ECU 10 on a screen. The buzzer 15 calls the driver's attention by being allowed to sound by an operation signal that is transmitted from the driving support ECU 10.

The driving support ECU 10 according to this embodiment is provided with a lane keeping support function and a lane departure alarm function as functions for the lane departure prevention support control. The lane keeping support function is a function for supporting the driver's steering operation by giving a steering mechanism the steering auxiliary torque so that a traveling position of the host vehicle is maintained in the vicinity of the target trace line. The lane departure alarm function is a function for giving the steering mechanism a small steering auxiliary torque and calling the driver's attention by using the buzzer 15 and the indicator 14 when the host vehicle is likely to depart from the traveling lane. These steering auxiliary torques differ from a steering assist torque that the electric power steering device generates in accordance with a steering wheel operation force during the driver's steering wheel operation and represent a torque that is given to the steering mechanism by a command from the driving support ECU 10 irrespective of the driver's steering wheel operation. Regarding the lane departure alarm function, the driver's steering operation may be supported by the steering auxiliary torque being generated to the same extent as the lane keeping support function.

A control for activating the lane keeping support function will be referred to as a lane keeping support control, and a control for activating the lane departure alarm function will be referred to as a lane departure alarm control. The lane keeping support control and the lane departure alarm control will be collectively referred to as the lane departure prevention support control.

The driving support ECU 10 is provided with a preceding vehicle following control function, apart from the lane departure prevention support function, for allowing the host vehicle to follow a preceding vehicle while an appropriate inter-vehicle distance is maintained between the preceding vehicle and the host vehicle in accordance with the vehicle speed. The driving support ECU 10 automatically selects the lane keeping support function in a case where the lane departure prevention support control is set to be carried out by the operation switch 12 (state where the operation switch 12 is turned ON) and the preceding vehicle following control is carried out and automatically selects the lane departure alarm function in a case where the preceding vehicle following control is not carried out. The driving support device for a vehicle may be configured for the driver to be capable of freely selecting the lane keeping support function or the lane departure alarm function by using the operation switch 12.

In a case where the lane keeping support function is selected, the driving support ECU 10 carries out the lane keeping support control. In this case, the driving support ECU 10 calculates the steering auxiliary torque that is suitable for the traveling position of the host vehicle to be maintained in the vicinity of the target trace line of the traveling lane based on the lane information sent from the camera sensor 13 (yaw angle, offset amount, road curvature) and the vehicle speed detected by the vehicle speed sensor 11, and transmits the auxiliary torque command which shows the calculated steering auxiliary torque to the steering ECU 20.

In a case where the lane departure alarm function is selected, the driving support ECU 10 carries out the lane departure alarm control. In this case, the driving support ECU 10 calculates a relationship between a position that a front wheel reaches in a predetermined length of time and a white line position based on the lane information sent from the camera sensor 13 and the vehicle speed detected by the vehicle speed sensor 11. In a case where it is estimated that the front wheel is on the white line in the predetermined length of time, the driving support ECU 10 calls the driver's attention by allowing the buzzer 15 to sound and transmits, to the steering ECU 20, the auxiliary torque command showing the steering auxiliary torque for calling the driver's steering operation.

Upon receiving the auxiliary torque command from the driving support ECU 10, the steering ECU 20 drives the assist motor 22 and gives the steering mechanism the steering auxiliary torque which has the control amounts (magnitude and steering direction) designated by the auxiliary torque command.

Interruption conditions are set as described below for the lane departure prevention support control (lane keeping support control and lane departure alarm control).

(1) Case where the lane marker cannot be recognized
(2) Case where it is determined that the driver is in a hand-off state
(3) Case where at least a certain level of the steering torque attributable to the driver is detected The lane departure prevention support control is interrupted in a case where one or more of these interruption conditions are satisfied. Interruption condition (2) may be a condition that is set with respect to only the lane keeping support control and may not be set with respect to the lane departure alarm control. In addition, another condition may be added to the interruption conditions. For example, a condition such as detection of a direction indicator operation and detection of an operation that causes the host vehicle to cross the lane marker can be added as the interruption condition.

Interruption condition (2) is satisfied when the driver's hand-off state is detected through a hand-off state determination routine (described later).

Interruption condition (3) is set to be satisfied when a substantial steering wheel operation such as a lane change operation is performed by the driver. Interruption condition (3) is set not to be satisfied during a normal steering wheel operation during traveling within the traveling lane.

The driving support ECU 10 interrupts the lane departure prevention support control upon the interruption condition being satisfied. The driving support ECU resumes the lane departure prevention support control upon the interruption condition being resolved thereafter.

The driving support ECU 10 according to this embodiment carries out the lane departure prevention support control in all vehicle speed regions. The all vehicle speed regions are a vehicle speed range from a vehicle speed of zero to a high vehicle speed, which is used for normal traveling of the vehicle. The vehicle speed region in which the lane departure prevention support control is carried out does not necessarily have to be the all vehicle speed regions. For example, the lane departure prevention support control may be carried out at or above an extremely low speed and a high-speed region may have a vehicle speed upper limit.

Hereinafter, a hand-off state determination processing that is carried out by the driving support ECU 10 will be described. FIG. 2 shows the hand-off state determination routine. When a control routine (not illustrated) for carrying out the lane departure prevention support control is executed, the driving support ECU 10 repeatedly carries out the hand-off state determination routine in parallel with at a predetermined calculation cycle.

After the hand-off state determination routine is started, the driving support ECU 10 determines in Step S11 whether or not the steering wheel is in a state of non-operation, that is, whether or not no steering wheel operation is performed by the driver. For example, in Step S11, the driving support ECU 10 acquires the steering torque information (steering torque Ts detected by the steering torque sensor 21) from the steering ECU 20 and determines whether or not a magnitude (absolute value) of the steering torque Ts is below a non-operation determination threshold Tref.

In a case where the steering torque Ts is below the non-operation determination threshold Tref (Ts<Tref), the driving support ECU 10 determines that no steering wheel operation is performed by the driver. Then, the processing proceeds to Step S12. In Step S12, the driving support ECU 10 increases a timer value t of a non-operation timer. The non-operation timer is a clocking timer that measures a duration in which it is determined that no steering wheel operation is performed by the driver. This timer value t will be referred to as a non-operation timer value t. The non-operation timer value t has an initial value set to zero (t=0).

Then, in Step S13, the driving support ECU 10 reads the vehicle speed V that is detected by the vehicle speed sensor 11, and sets a hand-off determination threshold tref based on the vehicle speed V. As is apparent from Steps S14 and S16 (described later), it is determined that the driver is in the hand-off state when a duration in which the steering torque Ts is below the non-operation determination threshold Tref (non-operation duration) exceeds the hand-off determination threshold tref. Accordingly, the "hand-off determination threshold tref" in Step S13 represents a threshold that is set for determining whether or not the driver is in the hand-off state.

Figure 3A:
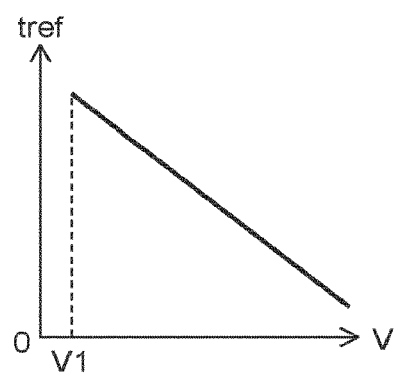
FIG. 3A is a graph illustrating a hand-off determination threshold map according to the embodiment.
Figure 3B:
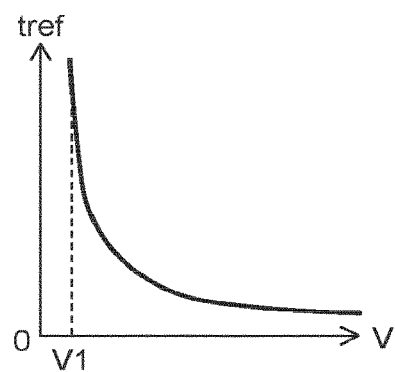
FIG. 3B is a graph illustrating the hand-off determination threshold map according to the embodiment.
Figure 3C:
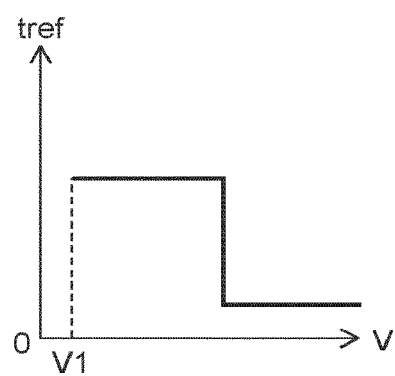
FIG. 3C is a graph illustrating the hand-off determination threshold map according to the embodiment.

The hand-off determination threshold tref is set, for example, to be higher in a case where the vehicle speed V is low than in a case where the vehicle speed V is high as illustrated in FIGS. 3A, 3B, and 3C. A hand-off determination threshold map that shows this relationship between the vehicle speed V and the hand-off determination threshold tref is stored in the driving support ECU 10. In Step S13, the hand-off determination threshold tref that corresponds to the vehicle speed V at the present point in time is calculated with reference to this hand-off determination threshold map. The hand-off determination threshold tref may be reduced in a linear function manner with respect to an increase in the vehicle speed V as illustrated in FIG. 3A, may be exponentially reduced with respect to an increase in the vehicle speed V as illustrated in FIG. 3B, or may be reduced in stages with respect to an increase in the vehicle speed V as illustrated in FIG. 3C. The hand-off determination threshold tref may be set to be higher in a case where the vehicle speed V is low than in a case where the vehicle speed V is high.

In a case where the vehicle speed V is lower than a hand-off determination prohibition vehicle speed V1, the hand-off determination threshold tref is set to an infinite value (that may be a value which does not result in a "Yes" determination in Step S14 (described later)). This hand-off determination prohibition vehicle speed V1 is a low vehicle speed value that is included in the vehicle speed region where the lane departure prevention support control is carried out, is set in advance, and exceeds zero.

Then, in Step S14, the driving support ECU 10 determines whether or not the non-operation timer value t exceeds the hand-off determination threshold tref. In other words, the driving support ECU 10 determines whether or not the duration in which it is determined that no steering wheel operation is performed by the driver exceeds the hand-off determination threshold tref. In a case where the non-operation timer value t does not exceed the hand-off determination threshold tref, the driving support ECU 10 temporarily terminates the hand-off state determination routine. The driving support ECU 10 repeatedly carries out the hand-off state determination routine at a predetermined calculation cycle. The duration in which it is determined that no steering wheel operation is performed by the driver exceeding the hand-off determination threshold tref corresponds to satisfaction of a specific condition according to the present disclosure.

Provided that the driver's steering wheel operation is detected while the non-operation timer value t does not exceed the hand-off determination threshold tref with this processing repeated (in the case of a No determination in S11), the driving support ECU 10 resets the non-operation timer value t in Step S15 (t=0). In a case where the duration in which it is determined that no steering wheel operation is performed by the driver exceeds the hand-off determination threshold tref (in the case of a Yes determination in S14), the driving support ECU 10 determines in Step S16 that the driver is in the hand-off state. Then, Interruption condition (2) is satisfied, and thus the driving support ECU 10 interrupts the lane departure prevention support control in Step S17. At this time, the driving support ECU 10 allows the buzzer 15 to sound and performs a hand-off driving caution display on the indicator 14.

When the lane departure prevention support control is interrupted, the driving support ECU 10 terminates the hand-off state determination routine. Then, the driving support ECU 10 waits until the interruption condition is resolved, and then resumes the lane departure prevention support control and resumes the hand-off state determination routine at the same time. In this case, the interruption condition is resolved by the driver's steering wheel operation being detected (Ts≥Tref).

According to the driving support device for a vehicle of this embodiment described above, the lane departure prevention support control is interrupted when the driver's hand-off state is detected while the lane departure prevention support control is carried out. This detection of the driver's hand-off state is performed based on whether or not the non-operation timer value t, which is the duration in which it is determined that no steering wheel operation is performed by the driver, exceeds the hand-off determination threshold tref. In addition, the hand-off determination threshold tref is set to be higher in a case where the vehicle speed V is low than in a case where the vehicle speed V is high. Accordingly, during a low-speed traveling, the condition that the non-operation timer value t exceeds the hand-off determination threshold tref (corresponding to the specific condition of the present disclosure) is less likely to be satisfied and the determination of the hand-off state is less likely to be made when during a high-speed traveling.

As a result, a more-than-necessary interruption of the lane departure prevention support control that is attributable to the determination of the hand-off state does not occur during the low-speed traveling. In addition, the sounding of the buzzer 15 and the hand-off driving caution display by the indicator 14 that result therefrom are not performed. Accordingly, this embodiment can allow the driver not to be bothered during a medium-low-speed traveling in particular while maintaining safety during the high-speed traveling.

In a case where the vehicle speed V is lower than the hand-off determination prohibition vehicle speed V1, the hand-off determination threshold tref is set for the hand-off state not to be detected. Accordingly, the interruption of the lane departure prevention support is prohibited. Accordingly, in a case where the vehicle is stopped for congestion or the like in particular, the hand-off state is not detected even if the driver releases his or her hand from the steering wheel, and thus the lane departure prevention support can continue with the initiation of the traveling of the vehicle, which leads to a high level of usability. Accordingly, the driver can effectively use the lane departure prevention support function in all the vehicle speed regions, and thus the driver's burden is reduced.

The embodiment described above is configured to determine whether or not no steering wheel operation is performed by the driver (S11) based on the magnitude of the steering torque Ts. However, the following modification examples can also be adopted instead.

For example, the driving support ECU 10 may be configured to acquire a steering angle θ that is detected by a steering angle sensor (not illustrated) and determine whether or not a steering angle variation (|Δθ|) is below a non-operation determination threshold Δθref based on the steering angle variation (|Δθ|), which is a magnitude of the amount of change in the steering angle θ per unit time, in Step S11. Even in this modification example, whether or not no steering wheel operation is performed by the driver can be determined based on the amount of the steering operation that the driver inputs to the steering wheel as in the embodiment.

In addition, the driving support ECU 10 may be configured to determine in Step S11 whether or not a grip on the steering wheel is detected by a touch sensor (not illustrated) with, for example, the touch sensor disposed in a grip portion of the steering wheel.

Figure 4:
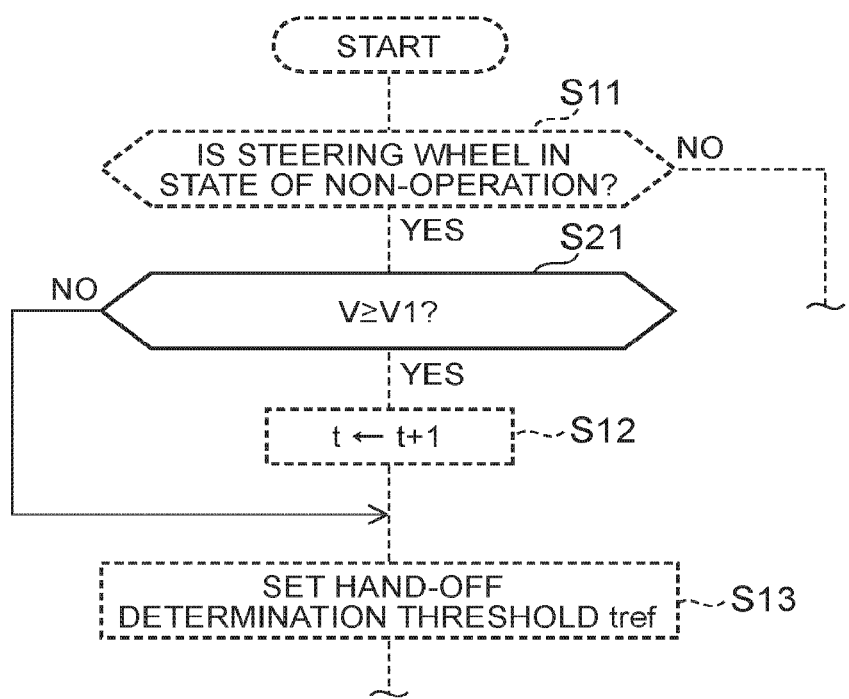
FIG. 4 is a flowchart according to the hand-off state determination routine (first modification example)

Hereinafter, a first modification example of the hand-off state determination routine will be described. FIG. 4 shows parts modified from the hand-off state determination routine according to the embodiment. This first modification example is configured such that the determination that the driver is in the hand-off state is less likely to be made during the low-speed traveling than during the high-speed traveling by the non-operation timer being stopped and the non-operation timer value t being maintained during the low-speed traveling.

In the first modification example of the hand-off state determination routine, a determination processing of Step S21 is added between Step S11 and Step S12 of the hand-off state determination routine according to the embodiment. Provided that it is determined that no steering wheel operation is performed by the driver (in the case of a Yes determination in S11), the driving support ECU 10 determines in Step S21 whether or not the vehicle speed V is equal to or higher than the hand-off determination prohibition vehicle speed V1. In a case where the vehicle speed V is equal to or higher than the hand-off determination prohibition vehicle speed V1, the driving support ECU 10 allows the processing to proceed to Step S12 and increases the non-operation timer value t. In a case where the vehicle speed V is lower than the hand-off determination prohibition vehicle speed V1, the driving support ECU 10 skips the processing of Step S12 and allows the processing to proceed to Step S13. The above-described modification example can be applied to the detection of the steering wheel operation in Step S11.

In the first modification example of the hand-off state determination routine, the measurement of the duration in which no steering wheel operation is performed by the driver is stopped in a case where the vehicle speed V is lower than the hand-off determination prohibition vehicle speed V1. In other words, the non-operation timer value t is maintained. Accordingly, in a situation in which the vehicle speed V is lower than the hand-off determination prohibition vehicle speed V1, the non-operation timer value t does not exceed the hand-off determination threshold tref, and thus a determination (confirmation) of the hand-off state is prohibited. In addition, during the low-speed traveling during which the vehicle speed V changes to repeatedly cross the hand-off determination prohibition vehicle speed V1, a substantial clocking speed of the non-operation timer value t is reduced, and thus the length of time until the determination of the hand-off state increases. Accordingly, a more-than-necessary interruption of the lane departure prevention support control that is attributable to the determination that the driver is in the hand-off state does not occur during the low-speed traveling as in the embodiment, and effects similar to those of the embodiment are achieved.

Figure 5A:
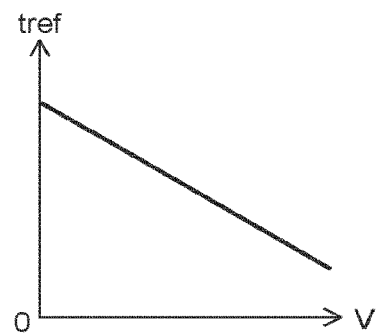
FIG. 5A is a graph illustrating a hand-off determination threshold map according to the first modification example.
Figure 5B:
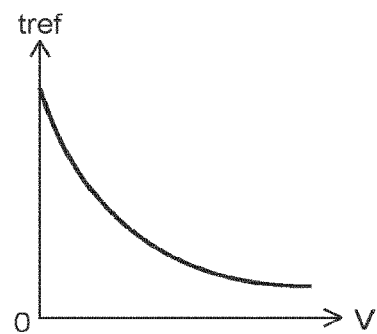
FIG. 5B is a graph illustrating the hand-off determination threshold map according to the first modification example.
Figure 5C:
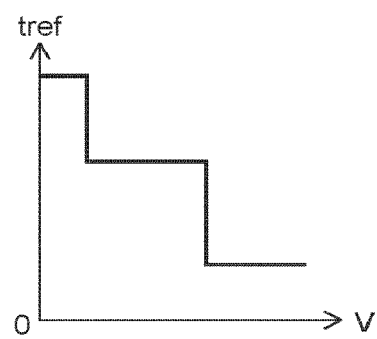
FIG. 5C is a graph illustrating the hand-off determination threshold map according to the first modification example.

In the first modification example of the hand-off state determination routine, the hand-off determination threshold tref that is used in Step S13 may be similar to that of the embodiment. Alternatively, for example, a value that is lower than the hand-off determination prohibition vehicle speed V1 may be set to a value that acts as a substantial threshold as illustrated in FIGS. 5A, 5B, and 5C.

Figure 6:
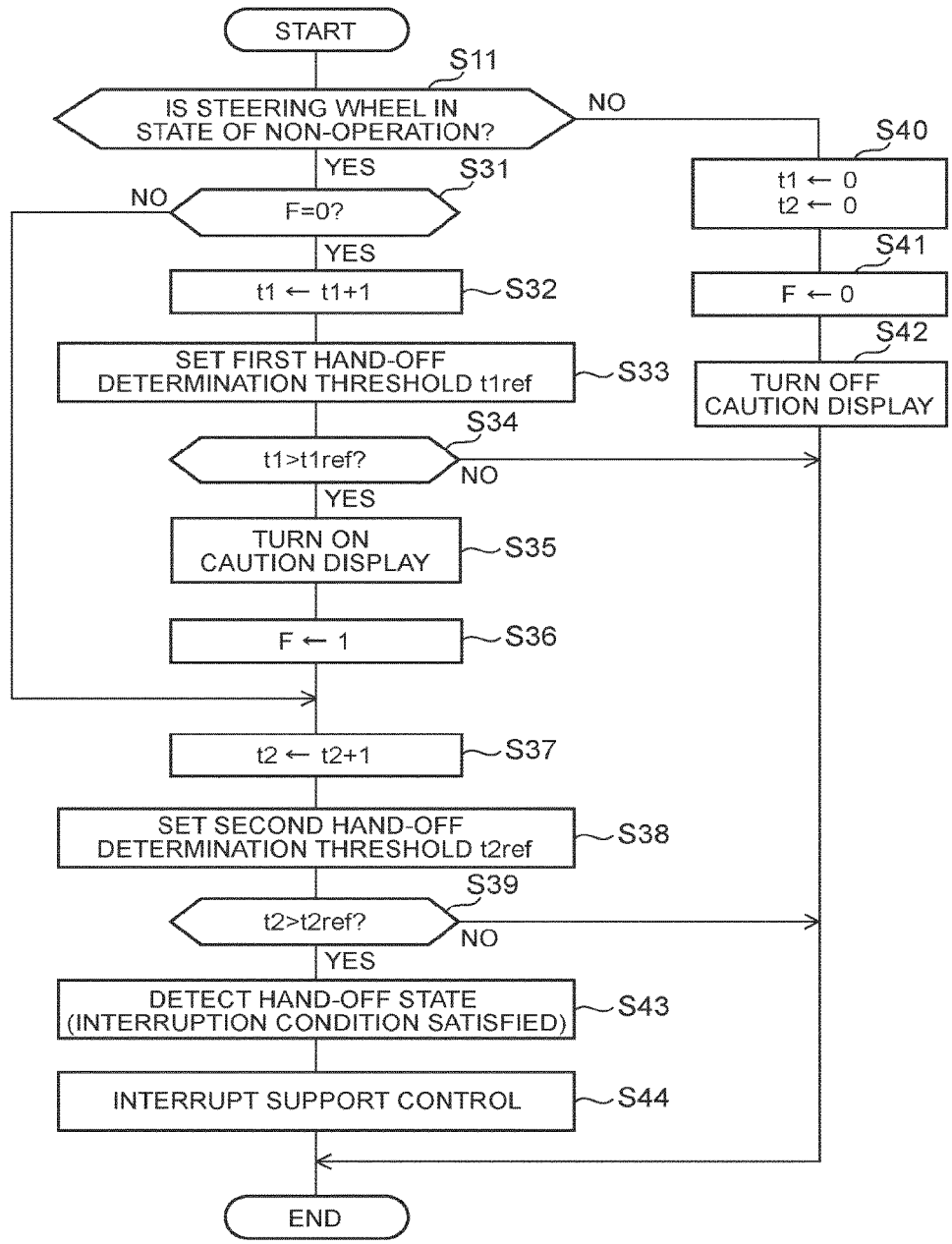
FIG. 6 is a flowchart according to the hand-off state determination routine (second modification example)

Hereinafter, a second modification example of the hand-off state determination routine will be described. FIG. 6 shows the second modification example of the hand-off state determination routine. In this second modification example, a step is included for calling the driver's attention regarding hand-off driving in the middle of the course reaching the determination of the hand-off state and the interruption of the lane departure prevention support control. A stage until the calling of the driver's attention regarding the hand-off driving in the situation in which the driver's steering wheel operation is not detected will be referred to as a first stage, and a stage until the determination (confirmation) of the hand-off state after the termination of the first stage will be referred to as a second stage. In the second modification example of the hand-off state determination routine, a threshold of the non-operation timer value for setting the length (time) of the first stage and a threshold of the non-operation timer value for setting the length (time) of the second stage are set in accordance with the vehicle speed.

Upon the second modification example of the hand-off state determination routine being started, the driving support ECU 10 determines in Step S11 whether or not the steering wheel is in the state of non-operation. In a case where the steering wheel is in the state of non-operation, the driving support ECU 10 determines in Step S31 whether or not a stage flag F is "0". This stage flag F is set to "0" in a case where the present point in time is the first stage and is set to "1" in a case where the present point in time is the second stage. An initial value of the stage flag F is set to "0". The above-described modification example can be applied to the detection of the steering wheel operation in Step S11.

Accordingly, the driving support ECU increases a timer value t1 of a first non-operation timer in Step S32 in a case where the stage flag F is set to "0". The first non-operation timer is a clocking timer that measures the duration in which it is determined that no steering wheel operation is performed by the driver in the first stage. The timer value t1 will be referred to as a first non-operation timer value t1. An initial value of the first non-operation timer value t1 is set to zero (t1=0).

Subsequently, the driving support ECU 10 reads the vehicle speed V that is detected by the vehicle speed sensor 11 and sets a first hand-off determination threshold t1ref based on this vehicle speed V in Step S33. For example, the first hand-off determination threshold t1ref is set with reference to a hand-off determination threshold map (map in which vertical axes of FIGS. 3A, 3B, and 3C are t1ref) which is similar to that of the embodiment. Then, the driving support ECU 10 determines in Step S34 whether or not the first non-operation timer value t1 exceeds the first hand-off determination threshold t1ref. In a case where the first non-operation timer value t1 does not exceed the first hand-off determination threshold t1ref, the second modification example of the hand-off state determination routine is temporarily terminated. The second modification example of the hand-off state determination routine is repeatedly carried out, at a predetermined calculation cycle, by the driving support ECU 10.

Provided that the driver's steering wheel operation is detected while the first non-operation timer value t1 does not exceed the first hand-off determination threshold t1ref with this processing repeated (in the case of a No determination in S11), the driving support ECU 10 resets the first non-operation timer value t1 and a second non-operation timer value t2 in Step S40. The second non-operation timer value t2 is a timer value that shows the duration of the second stage (described later). Then, the driving support ECU 10 sets the stage flag F to "0" in Step S41. This processing of Step S41 is a processing with respect to a case where the driver's steering wheel operation is detected in the second stage. Then, the driving support ECU 10 turns OFF the caution display in Step S42. This processing of Step S42 is also a processing with respect to the case where the driver's steering wheel operation is detected in the second stage. As described later, in the second stage, a caution message for calling the driver's attention regarding the hand-off driving is displayed on the indicator 14, and this processing is a processing for turning off the display of the caution message.

In a case where it is detected in Step S34 that the first non-operation timer value t1 exceeds the first hand-off determination threshold t1ref with the driver's steering wheel operation not being detected, the driving support ECU 10 displays the caution message for calling the driver's attention regarding the hand-off driving on the indicator 14 in Step S35, and then sets the stage flag F to "1" in Step S36. In this manner, the driving support ECU 10 makes a control processing transition from the first stage to the second stage.

Then, the driving support ECU 10 increases the timer value t2 of a second non-operation timer in Step S37. The second non-operation timer is a clocking timer that measures the duration in which it is determined that no steering wheel operation is performed by the driver in the second stage. The timer value t2 will be referred to as a second non-operation timer value t2. An initial value of the second non-operation timer value t2 is set to zero (t2=0).

Subsequently, the driving support ECU 10 reads the vehicle speed V that is detected by the vehicle speed sensor 11 and sets a second hand-off determination threshold t2ref based on this vehicle speed V in Step S38. For example, the second hand-off determination threshold t2ref is set with reference to a hand-off determination threshold map (map in which vertical axes of FIGS. 3A, 3B, and 3C are t2ref) which is similar to that of the embodiment. Then, the driving support ECU 10 determines in Step S39 whether or not the second non-operation timer value t2 exceeds the second hand-off determination threshold t2ref. In a case where the second non-operation timer value t2 does not exceed the second hand-off determination threshold t2ref, the second modification example of the hand-off state determination routine is temporarily terminated. The second modification example of the hand-off state determination routine is repeatedly carried out, at a predetermined calculation cycle, by the driving support ECU 10.

Provided that the driver's steering wheel operation is detected while the second non-operation timer value t2 does not exceed the second hand-off determination threshold t2ref with this processing repeated (in the case of a No determination in S11), the driving support ECU 10 allows the processing to proceed to Steps S40 to S42 and carries out the above-described processing.

In the second stage, the hand-off driving caution message is displayed on the indicator 14. Provided that it is detected that the second non-operation timer value t2 exceeds the second hand-off determination threshold t2ref with the driver's steering wheel operation not being detected in this state (in the case of a Yes determination in S39), the driving support ECU 10 determines in Step S43 that the driver is in the hand-off state. In other words, the hand-off state is detected. Accordingly, Interruption condition (2) is satisfied, and thus the driving support ECU 10 interrupts the lane departure prevention support control in Step S44. At this time, the driving support ECU 10 may call the driver's attention regarding the hand-off driving by the sounding of the buzzer 15 in addition to the caution message.

According to the second modification example of the hand-off state determination routine described above, the hand-off driving caution message is displayed before the lane departure prevention support control is interrupted by the detection of the hand-off state, and thus the interruption of the lane departure prevention support control can be reduced. In addition, the hand-off determination thresholds (t1ref, t2ref) can be arbitrarily set in the first stage and the second stage, and thus each of a hand-off driving caution message display timing and a lane departure prevention support control interruption timing can be appropriately set. In this case, the second hand-off determination threshold t2ref may be shorter than the first hand-off determination threshold t1ref.

In addition, in the second modification example, both the first hand-off determination threshold t1ref and the second hand-off determination threshold t2ref are variably set in accordance with the vehicle speed V. However, only one of the first hand-off determination threshold t1ref and the second hand-off determination threshold t2ref may be variably set in accordance with the vehicle speed V. For example, a value depending on the vehicle speed V may be set as the first hand-off determination threshold t1ref with a fixed value set as the second hand-off determination threshold t2ref.

Figure 7:
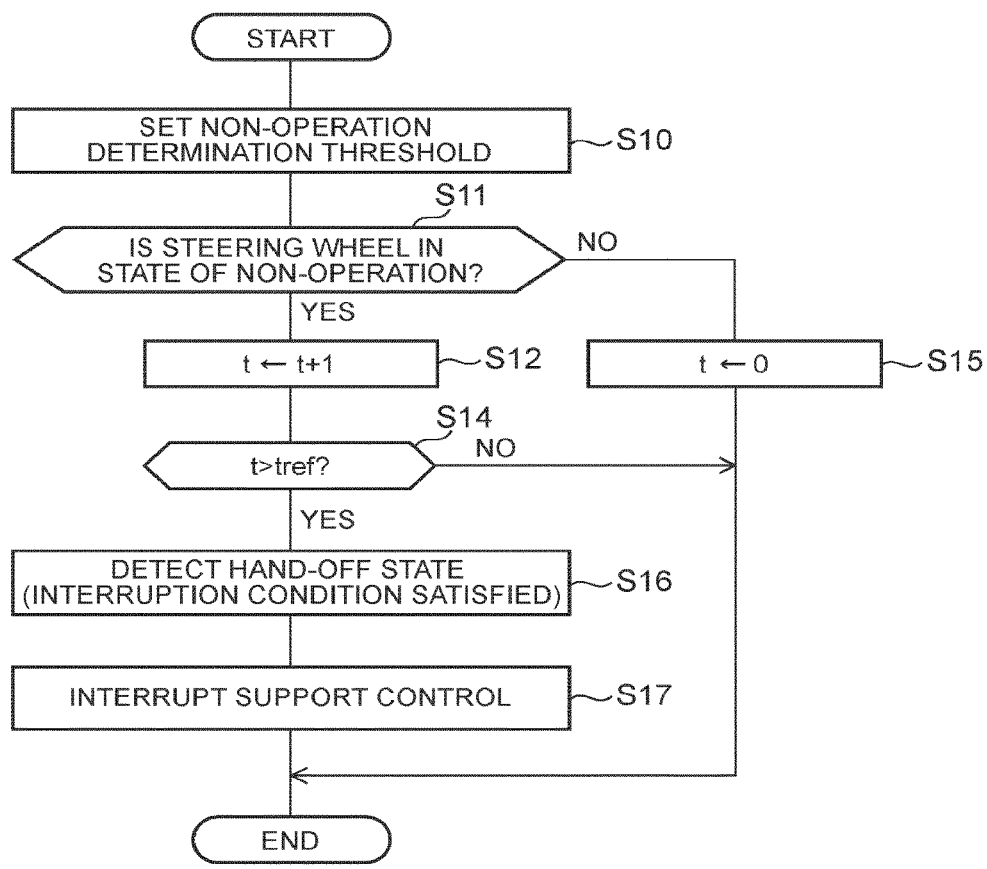
FIG. 7 is a flowchart according to the hand-off state determination routine (third modification example)

Hereinafter, a third modification example of the hand-off state determination routine will be described. FIG. 7 shows the third modification example of the hand-off state determination routine. In this third modification example, a non-operation determination threshold that is a threshold for determining whether or not no steering wheel operation is performed by the driver is set to be higher in a case where the vehicle speed V is low than in a case where the vehicle speed V is high.

In the third modification example of the hand-off state determination routine, the processing of Step S13 of the hand-off state determination routine according to the embodiment is removed and the processing of Step S10 is added instead prior to Step S11. The other processing is the same as that of the embodiment.

Upon the third modification example of the hand-off state determination routine being initiated, the driving support ECU 10 sets the non-operation determination threshold depending on the vehicle speed V in Step S10. This non-operation determination threshold is a threshold for performing a determination regarding whether or not no steering wheel operation is performed by the driver (non-operation determination). This non-operation determination threshold may be the non-operation determination threshold Tref for performing the non-operation determination based on the steering torque Ts as in the embodiment or may be the non-operation determination threshold $\Delta\theta$ref for performing the non-operation determination based on the steering angle variation ($|\Delta\theta|$) as described in the modification example relating to the detection of the steering wheel operation.

Figure 8A:
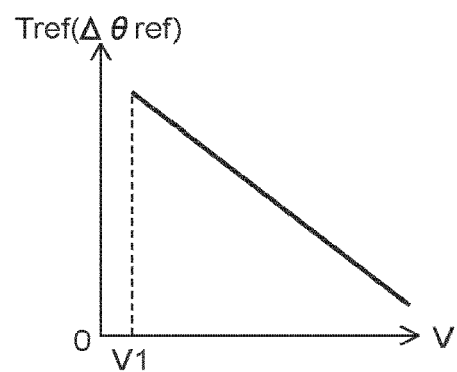
FIG. 8A is a graph illustrating a non-operation determination threshold map that is used in the hand-off state determination routine (third modification example)
Figure 8B:
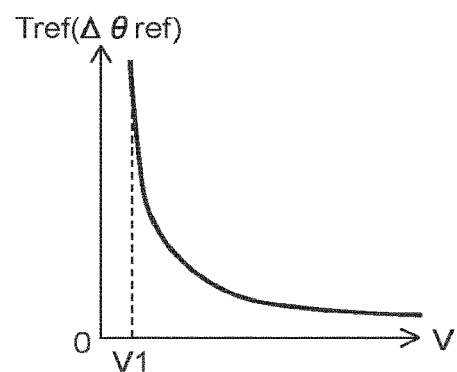
FIG. 8B is a graph illustrating the non-operation determination threshold map that is used in the hand-off state determination routine (third modification example)
Figure 8C:
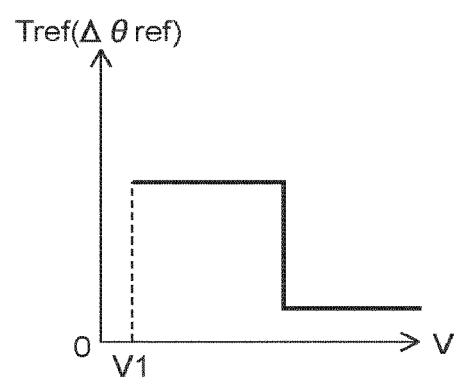
FIG. 8C is a graph illustrating the non-operation determination threshold map that is used in the hand-off state determination routine (third modification example)

For example, the non-operation determination threshold Tref (or $\Delta\theta$ref) is set to be higher in a case where the vehicle speed V is low than in a case where the vehicle speed V is high as illustrated in FIGS. 8A, 8B, and 8C. A non-operation determination threshold map that shows this relationship between the vehicle speed V and the non-operation determination threshold Tref (or $\Delta\theta$ref) is stored in the driving support ECU 10. In Step S10, the non-operation determination threshold Tref (or $\Delta\theta$ref) corresponding to the vehicle speed V at the present point in time is calculated with reference to this non-operation determination threshold map. The non-operation determination threshold Tref (or $\Delta\theta$ref) may be reduced in a linear function manner with respect to an increase in the vehicle speed V as illustrated in FIG. 8A, may be exponentially reduced with respect to an increase in the vehicle speed V as illustrated in FIG. 8B, or may be reduced in stages with respect to an increase in the vehicle speed V as illustrated in FIG. 8C. The non-operation determination threshold Tref (or $\Delta\theta$ref) may be set to be higher in a case where the vehicle speed V is low than in a case where the vehicle speed V is high.

In addition, since the processing of Step S13 is removed in the third modification example of the hand-off state determination routine, the hand-off determination threshold tref that is used in Step S14 may be a fixed value which is set in advance.

Even in the third modification example of the hand-off state determination routine, the determination condition for the determination of the hand-off state is stricter and the determination of the hand-off state is less likely to be made in a case where the vehicle speed is low than in a case where the vehicle speed is high. Accordingly, a more-than-necessary interruption of the lane departure prevention support control that is attributable to the determination that the driver is in the hand-off state does not occur during the low-speed traveling as in the embodiment, and effects similar to those of the embodiment are achieved.

Figure 9:
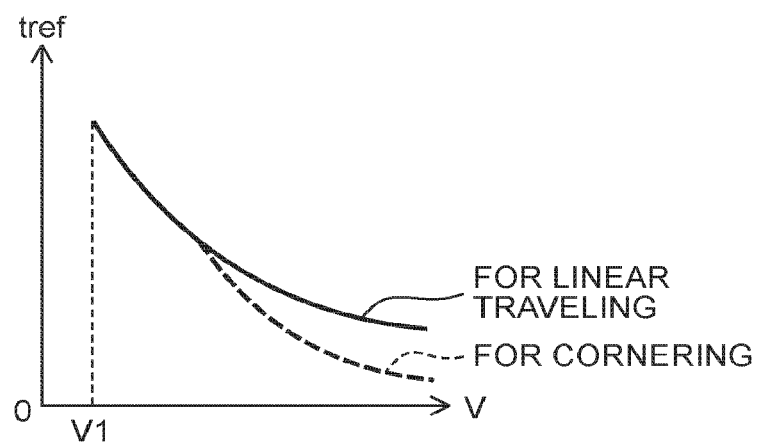
FIG. 9 is a graph according to a modification example of the hand-off determination threshold map.

Modification Example 1 of the hand-off determination threshold map can be applied to the embodiment, the first modification example, and the second modification example of the hand-off state determination routine. For example, the driving support ECU 10 may be configured, as illustrated in FIG. 9, to store hand-off determination threshold maps with different characteristics depending on whether the vehicle is in linear traveling or cornering and select the hand-off determination threshold map based on the road curvature included in the lane information. In this example, the hand-off determination threshold map for cornering is set to have a lower hand-off determination threshold tref in the high-speed region than the hand-off determination threshold map for linear traveling. This hand-off determination threshold tref can also be applied to the first hand-off determination threshold t1ref and the second hand-off determination threshold t2ref described above. According to Modification Example 1 of the hand-off determination threshold map, the determination of the hand-off state is made earlier during the cornering than during the linear traveling, and thus safety can be further improved.

In the example that is illustrated in FIG. 9, the hand-off determination threshold map for cornering is set to have a lower hand-off determination threshold tref than the hand-off determination threshold map for linear traveling only in the high-speed region. However, this relationship may be set in a low-speed region as well. In addition, various other configurations can be adopted such as a configuration in which a value that is obtained by multiplying the hand-off determination threshold tref which is obtained from the hand-off determination threshold map for linear traveling by a coefficient for cornering K (<1) is set to a hand-off determination threshold for cornering and a configuration in which the coefficient for cornering K varies in accordance with the vehicle speed V (for example, a configuration in which the coefficient for cornering K varies to a value decreasing as the vehicle speed V increases).

In the embodiment described above, the hand-off determination threshold map that leads to no determination of the hand-off state in a case where the vehicle speed V is lower than the hand-off determination prohibition vehicle speed V1 (refer to FIGS. 3A, 3B, and 3C) is used. However, this configuration is optional. For example, the hand-off determination threshold map that is illustrated in FIGS. 5A, 5B, and 5C may be referred to in Step S13 of the hand-off state determination routine of the embodiment (FIG. 2). In this configuration, the determination of the hand-off state can be less likely to be made in a case where the vehicle speed is low than in a case where the vehicle speed is high although a vehicle speed region in which the determination of the hand-off state is prohibited is not set. Accordingly, the excessive interruption of the lane departure prevention support control can be reduced during the low-speed traveling, and thus it is possible to allow the driver not to be bothered during the medium•low-speed traveling in particular while safety during the high-speed traveling is maintained. In addition, the lane departure prevention support function can be effectively used.

Figure 10:
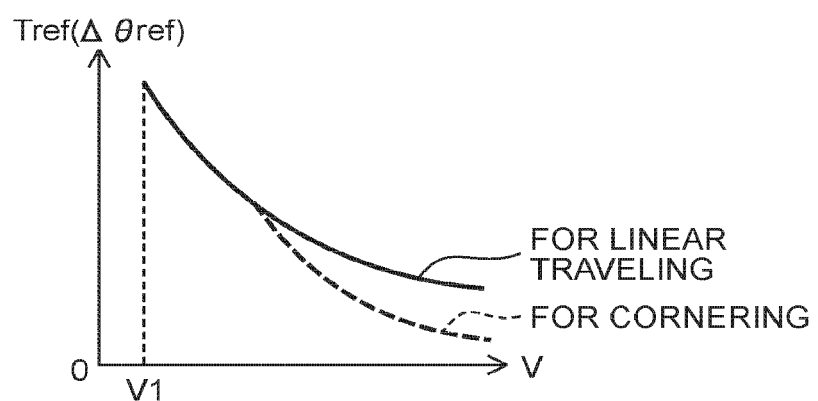
FIG. 10 is a graph according to a modification example of the non-operation determination threshold map.

Modification Example 1 of the non-operation determination threshold map can be applied to the third modification example of the hand-off state determination routine. For example, the driving support ECU 10 may be configured, as illustrated in FIG. 10, to store non-operation determination threshold maps with different characteristics depending on whether the vehicle is in linear traveling or cornering and select the non-operation determination threshold map based on the road curvature included in the lane information. In this example, the non-operation determination threshold map for cornering is set to have a lower non-operation determination threshold Tref (or Δθref) in the high-speed region than the non-operation determination threshold map for linear traveling.

In the example that is illustrated in FIG. 10, the non-operation determination threshold map for cornering is set to have a lower non-operation determination threshold Tref (or Δθref) than the non-operation determination threshold map for linear traveling only in the high-speed region. However, this relationship may be set in the low-speed region as well. In addition, various other configurations can be adopted such as a configuration in which a value that is obtained by multiplying the non-operation determination threshold Tref (or Δθref) which is obtained from the non-operation determination threshold map for linear traveling by the coefficient for cornering K (<1) is set to a non-operation determination threshold for cornering and a configuration in which the coefficient for cornering K varies in accordance with the vehicle speed V (for example, a configuration in which the coefficient for cornering K varies to a value decreasing as the vehicle speed V increases).

Figure 11A:
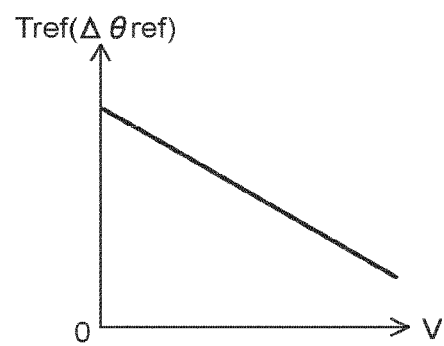
FIG. 11A is a graph according to the modification example of the non-operation determination threshold map.
Figure 11B:
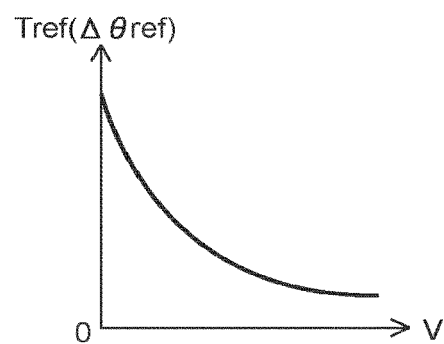
FIG. 11B is a graph according to the modification example of the non-operation determination threshold map.
Figure 11C:
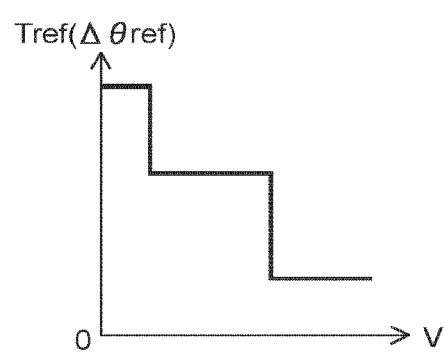
FIG. 11C is a graph according to the modification example of the non-operation determination threshold map.

In the third modification example of the hand-off state determination routine described above, the non-operation determination threshold map that leads to no determination of the hand-off state in a case where the vehicle speed V is lower than the hand-off determination prohibition vehicle speed V1 (refer to FIGS. 8A, 8B, and 8C) is used. However, this configuration is optional. For example, the non-operation determination threshold map that is illustrated in FIGS. 11A, 11B, and 11C may be referred to. In this configuration, the determination of the hand-off state can be less likely to be made in a case where the vehicle speed is low than in a case where the vehicle speed is high although the vehicle speed region in which the determination of the hand-off state is prohibited is not set. Accordingly, the excessive interruption of the lane departure prevention support control can be reduced during the low-speed traveling, and thus it is possible to allow the driver not to be bothered during the medium•low-speed traveling in particular while safety during the high-speed traveling is maintained. In addition, the lane departure prevention support function can be effectively used.

In a case where the vehicle speed V is lower than the set vehicle speed V1 (vehicle speed corresponding to the hand-off determination prohibition vehicle speed V1), the lane departure prevention support control may continue (with the interruption prohibited) without the hand-off state determination routine being carried out. In a case where a processing for determining whether or not the vehicle speed V is lower than the set vehicle speed V1 is incorporated into the hand-off state determination routine in FIG. 2 as its initial processing and the vehicle speed V is lower than the set vehicle speed V1, the hand-off state determination routine may be terminated at that point in time, while the processing may be allowed to proceed to Step S11 in a case where the vehicle speed V is equal to or higher than the set vehicle speed V1.

What is claimed is:

1. A driving support device for a vehicle comprising:
a hand-off determination unit configured to determine whether or not a specific condition is satisfied, the specific condition being a condition that a steering wheel is regarded as not being operated by a driver during execution of a lane departure prevention support control for giving a steering mechanism a steering auxiliary torque such that the vehicle travels within a lane;
a support interruption unit configured to interrupt the lane departure prevention support control when the hand-off determination unit determines that the specific condition is satisfied;
a vehicle speed detection unit configured to detect a vehicle speed; and
a vehicle speed response processing unit configured to control whether the support interruption unit interrupts the lane departure prevention support control based on the vehicle speed wherein,
the hand-off determination unit is configured to determine that the specific condition is satisfied when a non-operation duration of the steering wheel exceeds a hand-off determination time,
the vehicle speed response processing unit is configured to set the hand-off determination time pertaining to the case where the vehicle speed is lower than a predetermined vehicle speed to be longer than the hand-off determination time pertaining to the case where the vehicle speed is higher than the predetermined vehicle speed, and
the vehicle speed response processing unit is configured to set the hand-off determination time shorter when the vehicle is cornering than when the vehicle is in linear traveling.

2. The driving support device according to claim 1 wherein,
the vehicle speed response processing unit is configured to cause the specific condition to be less likely satisfied in a case where the vehicle speed is lower than a predetermined vehicle speed than in a case where the vehicle speed is higher than the predetermined vehicle speed.

3. The driving support device according to claim 1 wherein,
the vehicle speed response processing unit is configured to prohibit the interruption of the lane departure prevention support control by the support interruption unit in a case where the vehicle speed is lower than a set vehicle speed.

4. The driving support device according to claim 2, further comprising:
a cautioning unit configured to call driver's attention when the non-operation duration exceeds a caution determination time shorter than the hand-off determination time, wherein the vehicle speed response processing unit is configured to set at least one of the caution determination time and the hand-off determination time to a longer time in a case where the vehicle speed is lower than the predetermined vehicle speed than in a case where the vehicle speed is higher than the predetermined vehicle speed, and the vehicle speed response processing unit is configured to set at least one of the caution determination time and the hand-off determination time to a shorter time when the vehicle is cornering than when the vehicle is in the linear traveling.

5. The driving support device according to claim 3 wherein, the hand-off determination unit is configured to measure the non-operation duration during the execution of the lane departure prevention support control, and the vehicle speed response processing unit is configured to stop the measurement of the non-operation duration by the hand-off determination unit in a period when the vehicle speed is lower than the set vehicle speed.

6. The driving support device according to claim 3 wherein, the hand-off determination unit is configured to measure the non-operation duration during the execution of the lane departure prevention support control, and the vehicle speed response processing unit is configured to set the hand-off determination time to a length of time in which the non-operation duration does not reach the hand-off determination time in a period when the vehicle speed is lower than the set vehicle speed.

7. A driving support device for a vehicle comprising:

a hand-off determination unit configured to determine whether or not a specific condition is satisfied, the specific condition being a condition that a steering wheel is regarded as not being operated by a driver during execution of a lane departure prevention support control for giving a steering mechanism a steering auxiliary torque such that the vehicle travels within a lane;

a support interruption unit configured to interrupt the lane departure prevention support control when the hand-off determination unit determines that the specific condition is satisfied;

a vehicle speed detection unit configured to detect a vehicle speed; and a vehicle speed response processing unit configured to control whether the support interruption unit interrupts the lane departure prevention support control based on the vehicle speed wherein, the hand-off determination unit is configured to determine that the specific condition is satisfied when a non-operation duration of the steering wheel exceeds a hand-off determination time, the hand-off determination unit is configured to determine that the specific condition is satisfied when an operation amount of the steering wheel is less than a non-operation determination threshold, and the vehicle speed response processing unit is configured to set the non-operation determination threshold larger when the vehicle speed is lower than a predetermined vehicle speed than when the vehicle speed is higher than the predetermined vehicle speed, and to set the non-operation determination threshold smaller when the vehicle is cornering than when the vehicle is in linear traveling.

8. The driving support device according to claim 7 wherein, the vehicle speed response processing unit is configured to set a higher value for the non-operation determination threshold pertaining to a case where the vehicle speed is lower than a predetermined vehicle speed than the non-operation determination threshold pertaining to a case where the vehicle speed is higher than the predetermined vehicle speed.

9. A driving support device for a vehicle comprising:

a vehicle speed sensor that detects a vehicle speed; and circuitry configured to determine whether or not a specific condition is satisfied, the specific condition being a condition that a steering wheel is regarded as not being operated by a driver during execution of a lane departure prevention support control for giving a steering mechanism a steering auxiliary torque such that the vehicle travels within a lane;

to interrupt the lane departure prevention support control when the hand-off determination unit determines that the specific condition is satisfied, control whether the support interruption unit interrupts the lane departure prevention support control based on the vehicle speed, and determine that the specific condition is satisfied when a non-operation duration of the steering wheel exceeds a hand-off determination time, wherein the circuitry is configured to set the hand-off determination time pertaining to the case where the vehicle speed is lower than a predetermined vehicle speed to be longer than the hand-off determination time pertaining to the case where the vehicle speed is higher than the predetermined vehicle speed, and the circuitry is configured to set the hand-off determination time shorter when the vehicle is cornering than when the vehicle is in linear traveling.

10. The driving support device according to claim 9 wherein, the circuitry is configured to cause the specific condition to be less likely satisfied in a case where the vehicle speed is lower than a predetermined vehicle speed than in a case where the vehicle speed is higher than the predetermined vehicle speed.

11. The driving support device according to claim 9 wherein, the circuitry is configured to prohibit the interruption of the lane departure prevention support control in a case where the vehicle speed is lower than a set vehicle speed.

* * * * *